July 5, 1960
L. S. DANIELS
2,943,922
SOLIDS COOLING MEANS AND RISER CONDUIT
Filed April 1, 1953
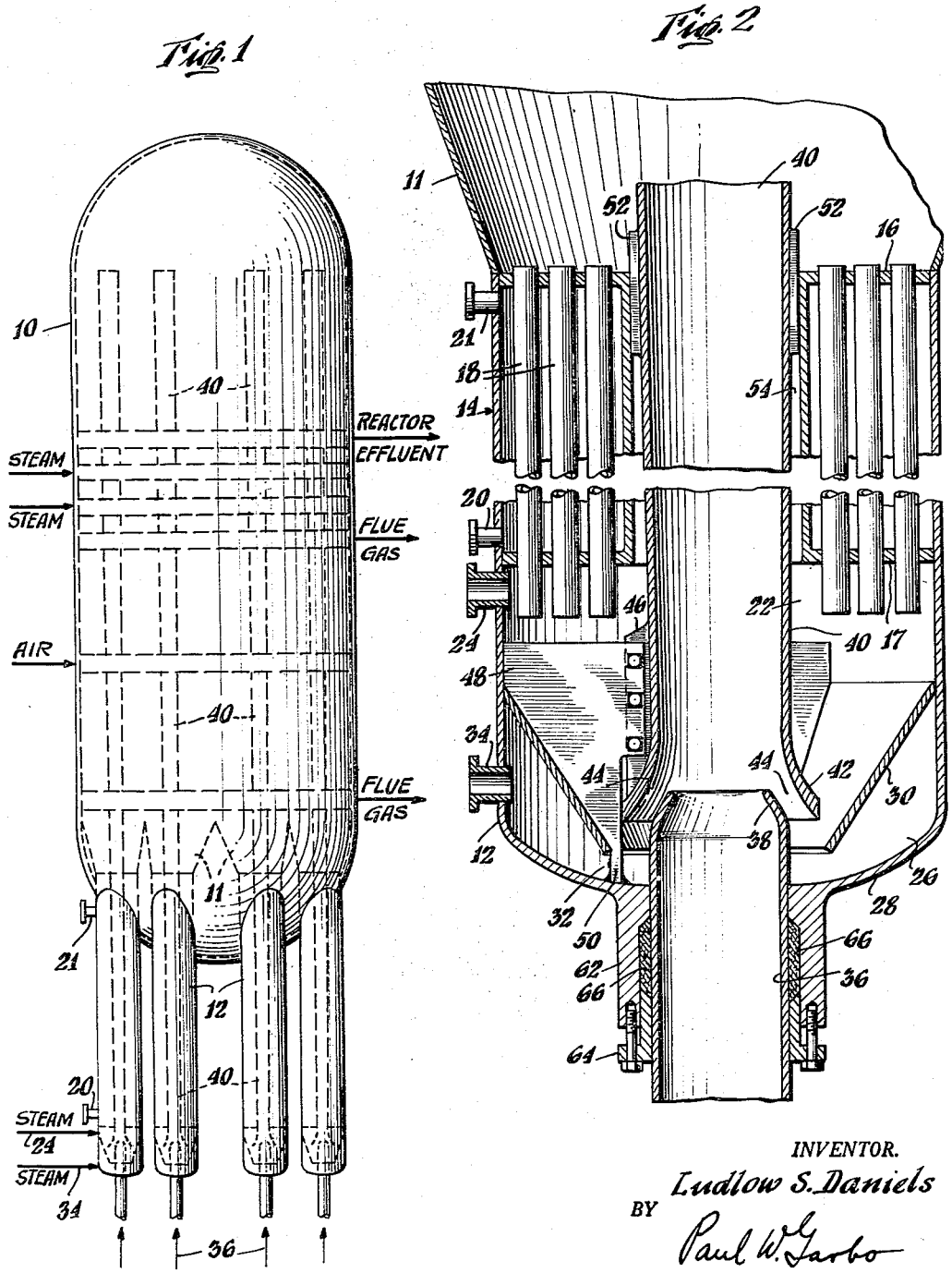
INVENTOR.
Ludlow S. Daniels
BY Paul W. Garbo
AGENT

United States Patent Office 2,943,922
Patented July 5, 1960

2,943,922

SOLIDS COOLING MEANS AND RISER CONDUIT

Ludlow S. Daniels, New York, N.Y., assignor to Hydrocarbon Research, Inc., New York, N.Y., a corporation of New Jersey Filed Apr. 1, 1953, Ser. No. 346,132

1 Claim. (Cl. 23—288)

This invention relates to an improved method and apparatus for carrying out catalytic reactions.

In catalytic reactions involving the circulation of a finely divided solid contact material or catalyst between a conversion zone and a regeneration zone, several problems are encountered in transferring the solids from one zone to the other. For instance, the regenerated solids must be stripped of adsorbed oxygen before entering the conversion zone and the gasiform reactants in the two zones must be kept from mixing with one another. Also, thermal adjustment and control of the regenerated solids is required for satisfactory operation of the conversion zone.

An object of this invention is to provide improved means for the transfer of solids from one zone to another of a catalytic reaction system.

A further object is to adjust and control the temperature of the solids undergoing transfer from one zone to another of the reaction system.

Further objects and advantages of the invention will be apparent from the description which follows.

Briefly, the catalyst or solids transfer means of this invention comprises a tubular leg adapted to depend from the bottom of a catalytic reactor, a pneumatic lift conduit extending up through the tubular leg with an annular space between the walls of the leg and conduit and having its lower end in communication with the lower end of the leg, and a tube-and-sheet type of heat exchanger disposed in the annular space through the tubes of which exchanger the solids pass before entering the open bottom end of the conduit. Steam introduced just below the heat exchanger acts in cooperation with restricted catalyst passageways through the exchanger to strip the catalyst and seal the uplift conduit against the leakage of gases from the bottom of the reactor. Operationally, a heat exchange medium circulating around the tubes of the heat exchanger controls the temperature of the catalyst passing through the tubes and may control the rate of flow of catalyst through the lift conduit. The catalyst transfer unit of this invention is particularly applicable to reactors through which the catalyst circulates as a moving bed from an upper conversion zone to a contiguous lower regeneration zone and in which the catalyst is entrained in a gaseous stream through a lift conduit to transfer catalyst from the bottom of the regeneration zone to the top of the conversion zone.

For a fuller understanding of the invention reference is made to the accompanying drawing wherein:

Figure 1 is a schematic elevation of a moving bed reactor provided with a plurality of catalyst transfer units; and Figure 2 is a schematic sectional elevation of a catalyst transfer unit.

The cylindrical leg 12 illustrated in Figure 2 depends substantially vertically from a reactor vessel. Leg 12 contains an annular heat exchanger 14 having two spaced tube sheets 16 and 17 and a plurality of vertical tubes 18 through which the catalyst flows. Ports 20 and 21 are used, respectively, to introduce and withdraw a heat exchange medium circulating around tubes 18. For brevity, heat exchanger 14 is hereinafter referred to as boiler 14. Beneath boiler 14 is an annular plenum chamber 22 in which the catalyst leaving tubes 18 collects. Seal steam introduced through inlet 24 just below lower tube sheet 17 passes up through tubes 18 in countercurrent stripping contact with the catalyst thereby preventing entry of gases from the reactor into the bottom of leg 12. As shown in Figure 2, the lower ends of tubes 18 preferably project beyond lower tube sheet 17 so that seal steam from inlet 24 flows around the several tubes 18 in the space left empty between tube sheet 17 and the catalyst mass discharging from tubes 18. Uniform entry of seal steam into tubes 18 is thus facilitated. The restricted flow area of tubes 18 simplifies catalyst stripping and allows efficient sealing by a small quantity of steam.

Beneath the point of seal steam introduction into plenum chamber 22 is an annular steam chest 26 formed by the side wall of leg 12, its bottom 28 and frusto-conical skirt 30. Control steam enters through an inlet 34 and exits from chest 26 through the annular space 32 left between the lower edge of skirt 30 and bottom 28 of leg 12. Frusto-conical skirt 30 is generally disposed at an angle of at least 60° to the horizontal. An inlet 36 entering leg 12 through a suitable connection in bottom 28 extends axially past annular space 32 to end just inside conduit 40 in an inwardly flared nozzle 38 while the lower end of left conduit 40 has an outward flaring 42. Lift conduit 40 extends concentrically through leg 12 and boiler 14 into the reactor vessel. The control steam from chest 26 flowing through annular space 32 entrains catalyst from the bottom of leg 12, carrying it through the annular opening 44 between flaring 42 and nozzle 38 into lift conduit 40 where together with the fluid exiting from inlet 36 it pneumatically transports the catalyst upwardly.

Lift conduit 40 is anchored near its bottom by a plurality of radial ribs 46 which are bolted to radial ribs 48 projecting towards lift conduit 40 from the walls of leg 12; each radial rib 48 has a tab or foot 50 attached to the bottom 28 of leg 12 for greater structural strength. Lift conduit 40 fits loosely in annular boiler 14, with radial guides 52 on the exterior of conduits 40 maintaining concentricity. Upon expanding or contracting with temperature changes, lift conduit 40 can slide freely up or down without in any way stressing the structure of boiler 14. The annular space 54 between lift conduit 40 and boiler 14 allows some of the catalyst to flow therethrough.

In operation, an increase in the rate of flow of catalyst down through tubes 18 will increase the rate of heat transfer to the heat exchange medium in boiler 14. Thus when generating steam in boiler 14, the rate of steam generation provides a convenient indicator of the catalyst flow rate through tubes 18. Accordingly, known means for measuring the rate of steam generation or the rate at which the heat exchange medium picks up heat from the catalyst passing through tubes 18 may be employed in association with control means that in response to changes observed by the measuring means will automatically adjust a valve in line 34. For instance, a decrease in the desired steam generation noted by the measuring means would cause the associated control means to open wider the valve in line 34 so that more entraining fluid would transport catalyst from plenum chamber 22 into lift conduit 40; thus, the catalyst flow down through tubes 18 would increase with the result that the rate of steam generation would also be increased until the desired rate of steam generation was attained. An increase in steam generation beyond the desired rate would act through the measuring means and the associated control means to set the valve in line 34 for a smaller flow of entraining fluid thereby decreasing the rate at which catalyst moves down tubes 18 and is carried from chamber 22 into lift conduit 40. Likewise, such measuring and control means may be employed to regulate the rate of fluid flow through line 36 in relation to the heat picked up in boiler 14 from the catalyst passing down through tubes 18.

Inlet line 36 enters bottom 28 of leg 12 through a housing 62. A retainer ring 64, the inner end of which slides inside housing 62, is bolted to housing 62 to compress flexible packing 66 and thus provide a tight seal around line 36. Inlet line 36 may be moved vertically to change the size of the annular opening 44.

Figure 1 illustrates a moving bed reactor vessel 10 provided with a multiplicity of catalyst return legs 12, laterally spaced apart from one another in a pattern whereby catalyst discharging from the several lift conduits 40 is spread uniformly across the top of the moving bed in reactor vessel 10. For a fuller disclosure of such a reactor vessel, reference is made to my copending application filed of even date herewith, now U.S. Patent 2,838,381. Each leg 12 is connected to the bottom of vessel 10 through a truncated cone 11 (Figs. 1 and 2). Since the catalyst flow down through each leg 12 may be individually controlled, any desired relative distribution of flowing catalyst among the several legs 12 can be readily maintained. Generally, instrumental control is directed towards maintenance of equal catalyst throughput in all lift conduits 40; also, equality of input through each line 36 is generally desired. In a reactor vessel 10 with a plurality of legs 12, the ability to close off one or more legs 12 allows a high degree of operational flexibility. Catalyst flow through any leg 12 is easily stopped by moving its inlet line 36 up until nozzle 38 meets flaring 42 of lift conduit 40 thereby closing the annular opening 44.

For the purposes of this invention, it is advisable to design the left conduits 40 so that each will handle on the order of 5000 barrels per day of charge oil; for such service, each conduit 40 will be approximately 12 inches in diameter, preferably tapering to a diameter of about 18 inches at its upper end. Particularly with reactor vessels which are 20 feet or more in diameter, it is well to limit the size of the lift conduits 40 so that each will handle a catalyst flow rate corresponding to an oil charging rate not in excess of about 10,000 barrels per day.

In view of the various modifications of the invention which will occur to those skilled in the art upon consideration of the foregoing disclosure without departing from the spirit or scope thereof, only such limitations should be imposed as are indicated by the appended claim.

What is claimed is:

A tubular leg open at one end from which it is adapted to depend vertically from and communicate with the bottom of a reactor, in combination with a contact material uplift conduit extending centrally in said leg from near the bottom thereof to substantially beyond the open end of said leg with a length sufficient for it to reach a point near the top of said reactor when installed, said uplift conduit being fastened solely by its lower end to the bottom end of said leg with its walls and said lower end spaced from the walls and bottom end of said leg, a fluid inlet disposed in said bottom end and discharging into said lower end of said uplift conduit, said leg and said uplift conduit being cylindrical and forming an annular space therebetween, an annular boiler disposed in said annular space, said boiler having a plurality of vertical tubes supported in parallel by upper and lower spaced tube sheets, a frusto-conical baffle disposed in said leg below said lower tube sheet to form therebetween an annular plenum chamber into which the bottom ends of said vertical tubes discharge, a fluid inlet in communication with the upper portion of said plenum chamber, said bottom ends of said vertical tubes projecting below said lower tube sheet and said fluid inlet in communication with said upper portion of said plenum chamber, said baffle being sloped toward said uplift conduit and having its inner periphery positioned adjacent the lower end of said uplift conduit, and an inlet for supplying a fluid to the space in said leg beneath said baffle.

References Cited in the file of this patent

UNITED STATES PATENTS

| | | |
|---|---|---|
| 2,461,104 | Bates | Feb. 8, 1949 |
| 2,477,502 | Utterback et al. | July 26, 1949 |
| 2,493,218 | Bergstrom | Jan. 3, 1950 |
| 2,542,887 | Watson | Feb. 20, 1951 |
| 2,557,842 | Ruthruff | June 19, 1951 |
| 2,625,467 | Barker | Jan. 13, 1953 |
| 2,642,346 | Keith | June 16, 1953 |
| 2,672,407 | Leffer | Mar. 16, 1954 |
| 2,690,056 | Bergstrom | Sept. 28, 1954 |
| 2,723,180 | Celani | Nov. 8, 1955 |
| 2,727,810 | Leffer | Dec. 20, 1955 |
| 2,756,193 | Bergstrom | July 24, 1956 |
| 2,765,265 | Bourguet | Oct. 2, 1956 |
| 2,838,381 | Daniels | June 10, 1958 |